United States Patent [19]

Mitsutsuka

[11] Patent Number: 4,488,964
[45] Date of Patent: Dec. 18, 1984

[54] APPARATUS FOR REMOVING A RADIOACTIVE SUBSTANCE FROM A MOLTEN METAL

[75] Inventor: Norimasa Mitsutsuka, Yamato, Japan

[73] Assignee: Tokyo Shibaura Denki Kabushiki Kaisha, Kawasaki, Japan

[21] Appl. No.: 945,344

[22] Filed: Sep. 25, 1978

[30] Foreign Application Priority Data

Sep. 30, 1977 [JP] Japan ................. 52-116598

[51] Int. Cl.$^3$ .............................................. B01D 35/18
[52] U.S. Cl. ................... 210/182; 210/299;
210/774; 62/55.5; 376/312; 376/313
[58] Field of Search ............................. 176/37, 68, 82;
62/55.5; 210/71, 182, 299, 774; 376/312, 313

[56] References Cited

U.S. PATENT DOCUMENTS

| | | | |
|---|---|---|---|
| 2,879,157 | 3/1959 | Batutis | 176/37 |
| 3,141,829 | 7/1964 | Fortesque | 176/68 |
| 3,197,376 | 7/1965 | Balent | 176/37 |
| 3,274,066 | 9/1966 | Zumwalt | 176/68 |
| 3,387,767 | 6/1968 | Hecht | 62/55.5 |
| 3,552,485 | 1/1971 | Le Jannou | 62/55.5 |
| 3,693,959 | 9/1972 | Swinhoe | 176/37 |
| 3,941,586 | 3/1976 | McKee | 176/37 |
| 3,962,082 | 6/1976 | Hundal | 210/71 |
| 4,010,068 | 3/1977 | Cooper | 176/37 |
| 4,075,060 | 2/1978 | Colburn | 176/37 |

FOREIGN PATENT DOCUMENTS 49-71400 of 1974 Japan ............................. 176/37

OTHER PUBLICATIONS

J. Yevick et al., Fast Reactor Technology: Plant Design, (MIT Press, 1966) at pp. 224-230 and 712, (§4.3.7.2-3, and FIG. 11.40).

Mitsutsuka, N., Shimojima, N., Gohshi, Y., and Feverstein, H., *Cold Trapping of Fission Products in a Stainless Steel Loop,* Journal of Nuclear Science and Technology, (Atomic Energy Society of Japan), vol. 14, No. 2, pp. 135-146, (Feb. 1977).

Holmes, et al., Sodium Purification by Cold Trapping at the Experimental Breeder Reactor II, Nuclear Technology, vol. 32, 3177, pp. 304-314.

*Primary Examiner*—Richard E. Schafer
*Assistant Examiner*—Daniel Wasil
*Attorney, Agent, or Firm*—Oblon, Fisher, Spivak, McClelland & Maier

[57] ABSTRACT

An apparatus for removing a radioactive substance from a molten metal which comprises a cold trap for crystallizing an impurity out of the molten metal; a radioactive substance-adsorbing unit which communicates with the cold trap and in which a radioactive substance-adsorbing material is filled with a specific surface area of at least 10 cm$^2$/cm$^3$ to eliminate a radioactive substance from the impurity; means for heating the molten metal conducted from the cold trap to the radioactive substance-adsorbing unit; and means for controlling the temperature of the heating means by measuring the temperature of the cold trap and radioactive substance-adsorbing unit.

3 Claims, 4 Drawing Figures

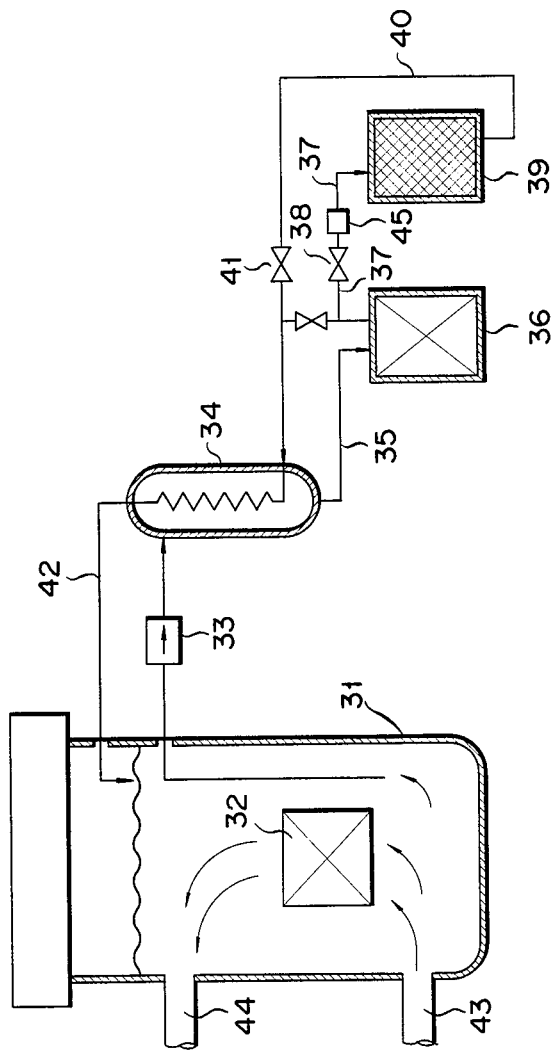
F I G. 3

APPARATUS FOR REMOVING A RADIOACTIVE SUBSTANCE FROM A MOLTEN METAL

BACKGROUND OF THE INVENTION

This invention relates to a radioactive substance-removing apparatus used with a system of circulating a molten metal such as molten sodium applied as a coolant of, for example, a Fast Breeder Reactor for the purpose of eliminating a radioactive substance from the molten sodium.

Hitherto, a cold trap has been used in purifying molten sodium conducted as a coolant through a circulating system used with, for example, a sodium-cooled nuclear reactor. The prior art process of removing impurities from the molten sodium is to decrease the temperature of the molten sodium and solubility of the impurities to crystallize them out, followed by filtration. The process is based on the principle that a decline in the temperature of the molten sodium reduces the solubility of the impurities contained therein.

Though very effective for elimination of impurities such as sodium oxide or sodium hydride from a sodium coolant, the conventional separator only using a cold trap presents difficulties in removing all impurities thereof. Namely where impurities are contained in the sodium coolant at such a low concentration as prevents them from reaching saturated solubility even when cooled, or the impurities originally have high solubility, then the impurities are not effectively, crystallized out, but simply pass unnoticed through a mass charged in the cold trap.

In such case, a radioactive substance is possibly dissolved in the sodium coolant at a higher concentration than allowed. Therefore, the known separator solely based on the cold trap fails to eliminate radioactive substances such as nuclear fission products (F.P.) or radioactive corrosion product (C.P.). To date, no method has been proposed which can effectively resolve difficulties encounted in the elimination of the above-mentioned radioactive substance.

SUMMARY OF THE INVENTION

This invention has been accomplished in view of the above-mentioned circumstances, and is intended to provide a molten metal-purifying apparatus which can almost completely remove even those radioactive substances from a molten metal used, for example, as a nuclear reactor coolant which have failed to be fully eliminated by the customary molten metal-purifying device.

A molten metal-purifying apparatus embodying this invention comprises a cold trap including a filter for crystallizing impurities out of a molten metal used, for example, as a nuclear reactor coolant; a radioactive substance-adsorbing unit in which a radioactive-adsorbing material is filled with a specific surface area of at least 10 $cm^2/cm^3$; means for conducting the molten metal from the cold trap to the radioactive substance-adsorbing unit; means for heating the molten metal running from the cold trap to the radioactive substance-adsorbing unit; and means for controlling the temperature of the heating means by measuring the temperature of the cold trap and radioactive substance-adsorbing unit.

BRIEF DESCRIPTION OF THE DRAWING

FIG. 3 indicates a block arrangement of a nuclear reactor provided with a radioactive substance-removing apparatus embodying this invention.

DESCRIPTION OF THE PREFERRED EMBODIMENTS

Figure 1A:
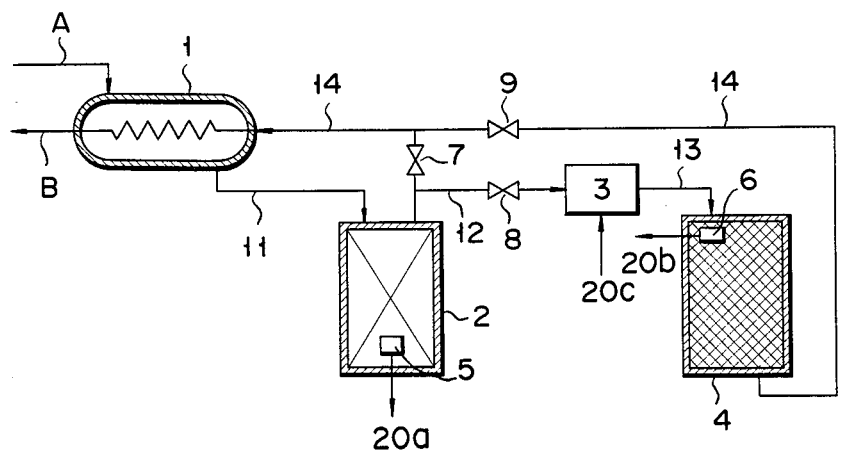
FIGS. 1A, 1B and 2 schematically show the different block arrangements of a radioactive substance-removing apparatus according to the various embodiments of this invention.

The present inventor has studied the behavior of a radioactive substance contained in a sodium coolant at a low concentration below solubility, using an inpile sodium loop, and discovered that the radioactive substance is adsorbed to a solid wall surface at low temperature; the radioactive substance contained in the sodium coolant is further removed as the radioactive substance is adsorbed to the solid wall surface over a larger area; a removed amount of the radioactive substance increases in proportion to the specific surface area of the solid wall (a ratio of the surface area to the effective volume); the unit area adsortion of the radioactive substance varies with the kind of element constituting said radioactive substance and adsorbing material; and based on the same concentration and the same material, the radioactive substance is more adsorbed at lower temperature.

Where an attempt is made to remove a radioactive substance contained in a sodium coolant by utilizing the above-mentioned adsorbing characteristic of the radioactive substance, a cold trap constructed by the customary method has the drawbacks that the adsorption area against the radioactive substance is insufficient; an attempt to enlarge the adsorbtion area will unavoidably invite an increase in mesh of the filtration area of the trap, so that the passageway of the sodium coolant is plugged with a crystallized impurity such as sodium oxide or sodium hydride, thus obstructing the original function of the cold trap; an attempt to enlarge the surface area without increasing the specific surface area will undesirably render the radioactive substance-removing apparatus bulky.

To resolve the above-mentioned difficulties, the radioactive substance-removing apparatus of this invention is designed first to conduct a sodium coolant through a cold trap to eliminate an impurity such as sodium oxide or sodium hydride, and then carry the sodium coolant now stripped of an impurity through a radioactive substance-adsorbing unit whose temperature is controlled and which has a large specific surface area, thereby effectively eliminating a radioactive substance.

Namely, the radioactive substance-removing apparatus of this invention is characterized in that a cold trap is provided as in the prior art to crystallize impurities out of a molten metal by reducing its temperature; heating the molten metal which has passed through the cold trap; and controlling the temperature of the molten metal running from the cold trap to a radioactive substance-adsorbing unit to prevent said temperature from falling below the temperature of the coldest section of the cold trap, thereby avoiding the plugging of the radioactive-adsorbing unit with crystallized impurities and effectively adsorbing a radioactive substance.

A radioactive substance-adsorbing material available for use with the radioactive substance-removing apparatus of this invention includes metals such as stainless steel, iron, nickel, chromium, cobalt, and manganese or alloys thereof, ceramics such as alumina and other materials like activated carbon. Any of these adsorbing materials is filled in a radioactive substance-adsorbing unit with a specific surface area of at least 10 cm$^2$/cm$^3$ in the form of a mesh or fine granules.

There will now be described the preferred embodiments of this invention by reference to the accompanying drawing.

Referring to FIG. 1A, referential numeral 1 is a heat exchanger; 2 a cold trap; and 3 a heater. These units are connected together by pipes 11, 12. The heater 3 is connected to a radioactive substance-adsorbing unit 4 through a pipe 13. A sodium coolant loop is provided which extends from the downstream side of the radioactive substance-adsorbing unit 4 to the heat exchanger 1 through a pipe 14 and valve 9. The radioactive substance-adsorbing unit 4 is densely filled with a rolled mesh of a radioactive-adsorbing material, for example, stainless steel to increase a specific surface area. Numerals 5, 6 are thermometers, which respectively measure the temperature of the coldest section 20a of the cold trap 2 and that of a sodium coolant 20b entering the radioactive substance-adsorbing unit 4. Numerals 7, 8 are valves. The valve 7 is mounted on a connection pipe between pipes 12, and 14, and the valve 8 is provided on the pipe 12.

Figure 1B:
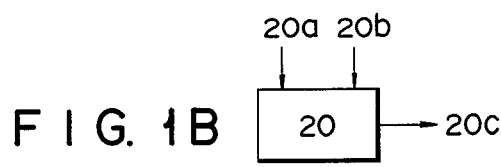

There will now be described the operation of the radioactive substance-removing apparatus of this invention. With the valve 7 opened, and the valves 8, 9 closed, the subject apperatus has exactly the same function as the ordinary cold trap. Namely, a sodium coolant is delivered from a nuclear reactor through a pipe A to the heat exchanger 1, where the coolant is cooled. The cooled coolant enters the cold trap 2 to be further cooled by a cooling device (not shown). Impurities contained in the coolant are crystallized and filtered in the cold trap 2. The purified coolant is returned to the nuclear reactor through the heat exchanger and a pipe B. Where the sodium coolant does not contain a radioactive substance which has to be removed or the content of a radioactive substance is below the prescribed concentration, the radioactive substance-removing apparatus of this invention is operated in the same manner as the ordinary cold trap. Where, the sodium coolant contains such large amount of a radioactive substance as requires removal, then the present apparatus is operated in the following manner. Namely, with the valve 7 closed, and the valves 8, 9 opened, the sodium coolant which has passed through the cold trap 2 is made to enter the heater 3 and radioactive substance-adsorbing unit 4. Output signals from the thermometers 5, 6 are conducted to a temperature controlling unit 20. This temperature-controlling unit 20 issues, as shown in FIG. 1B, a temperature-controlling signal to the heater 3 to prevent the temperature 20B of the sodium coolant entering the radioactive substance-adsorbing unit 4 (indicated by the thermometer 6) from falling below the temperature of the coldest section 20a of the cold trap 2 (indicated by the thermometer 5). The radioactive substance-adsorbing unit 4 has its temperature preserved by a jacket and preheater (neither shown) to avoid a drop in the temperature of the incoming sodium coolant. This arrangement prevents the temperature of the sodium coolant received in the radioactive substance-adsorbing unit 4 from falling below the temperature of the coldest section of the cold trap 2, thereby suppressing the crystallization of an impurity. Therefore, even where densely filled with a radioactive-adsorbing material to increase the specific surface area, the radioactive substance-adsorbing unit 4 is not plugged with crystallized impurities. Since the sodium coolant brought to the radioactive substance-adsorbing unit 4 is previously cooled by the cold trap 2, it is unnecessary to provide any extra cooler. The sodium coolant which is previously cooled in the cold trap to remove an impurity such as sodium oxide can be conveniently utilized in elevating the adsorption of a radioactive substance.

Figure 2:
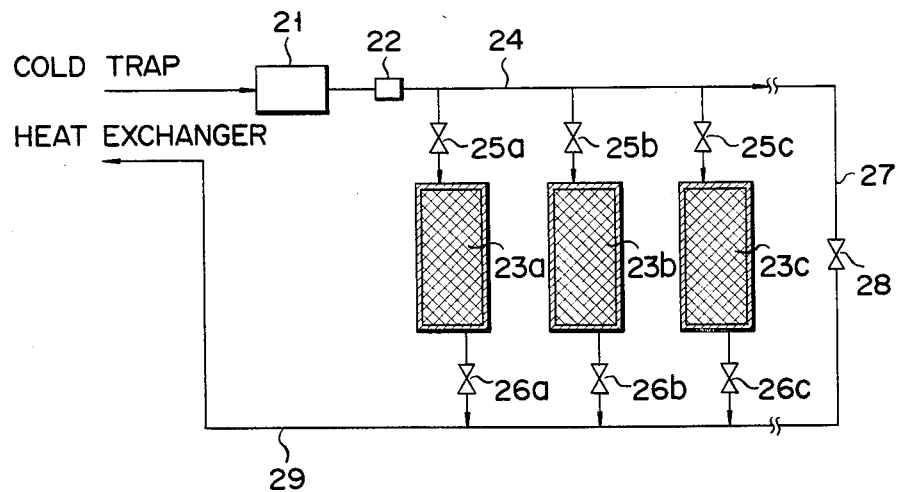

FIG. 2 shows the arrangement of a radioactive substance-removing apparatus according to another embodiment of this invention. According to this embodiment, a plurality of radioactive substance-adsorbing chambers 23a, 23b, 23c are provided in parallel for a single cold trap. A molten metal flowing from the cold trap 2 (not indicated in FIG. 2) passes through the heater 21 to the thermometer 22 where the temperature of the molten metal is measured. Then the molten metal runs through the pipe 24 and is branched into the plural radioactive substance-adsorbing chambers 23a, 23b, 23c through the corresponding valves 25a, 25b, 25c. The molten metal purified by the radioactive substance-adsorbing chambers 23a, 23b, 23c is carried through a pipe 29 to a heat exchanger (not shown). Referential numeral 27 is by-pass pipe and 28 is a valve.

FIG. 3 shows a sodium-cooled nuclear reactor provided with a radioactive substance-removing apparatus embodying this invention. Part of a sodium coolant heated in the core 32 of a nuclear reactor 31 is conducted from a pump 33 to a heat exchanger 34, and then to a cold trap 36 through a pipe 35. In the cold trap, the sodium coolant is stripped of impurities, and then runs into a radioactive substance-adsorbing unit 39 through a by-pass 37, valve 38 and heater 45. The radioactive substance-adsorbing unit 39 eliminates a radioactive substance from the sodium coolant for purification. The purified sodium coolant is conducted through a pipe 40, valve 41, heat exchanger 34 and pipe 42 back to the nuclear reactor. In FIG. 3, referential numeral 43 is a sodium coolant inlet pipe, and 44 a sodium coolant outlet pipe. In the foregoing embodiment, the cold trap 36 was provided with a heat exchanger 34. However, the radioactive substance-removing apparatus of this invention is not limited to this arrangement but may be used with any other type of cold trap.

This invention will be more fully understood from the following example.

EXAMPLE

There was used a radioactive substance-removing apparatus embodying this invention which was arranged as indicated in FIG. 1A. With the valve 7 opened, and the valves 8, 9 closed, the present radioactive substance-removing apparaus was operated in the same manner as the ordinary cold trap at a temperature of 110° C. A molten sodium coolant containing 10 nCi/ml of cesium-137 was circulated through a route consisting of the heat exchanger 1, pipe 11, cold trap 2, valve 7 and pipe 14, thereby eliminating 14% of the cesium-137 contained in the sodium coolant.

Thereafter, with the valve 7 closed, and the valves 8, 9 opened, the sodium coolant which passed through the cold trap 2 was conducted to the heater 3 and heated to a temperature of 120° C., and then passed to the radioactive substance-removing apparatus 4 in which a stainless steel mesh was filled with a specific surface area of 100 cm$^2$/cm$^3$. As the result, the sodium coolant recovered by the pipe 14 contained only 2 nCi/ml of cesium-137, indicating that 80% of the cesium-137 was recovered.

Where the stainless steel mesh used as a radioactive substance adsorbent was replaced by any of iron, nickel, chromium, manganese or alloys thereof, beta alumina and activated carbon, there was still obtained substantially the same result as in the foregoing example.

What is claimed as new and desired to be secured by Letters Patent of the United States is:

1. An apparatus for removing a radioactive substance from a molten metal which comprises a cold trap for crystallizing an impurity out of the molten metal; a radioactive substance-adsorbing unit in which a radioactive substance-adsorbing material is filled with a specific surface area of at least 10 $cm^2/cm^3$; means for conducting the molten metal from the cold trap to the radioactive substance-adsorbing unit; means positioned between said cold trap and said adsorbing unit for heating the molten metal delivered from the cold trap to the radioactive substance-adsorbing unit; and means adapted for controlling the temperature of the heating means by measuring the temperature of the cold trap and radioactive substance-adsorbing unit, whereby the temperature in said adsorbing unit is maintained above the minimum temperature in said cold trap.

2. The radioactive substance-removing apparatus according to claim 1, wherein the radioactive substance-adsorbing unit is formed of a plurality of parallel-arranged radioactive substance-adsorbing chambers which separately communicate with the cold trap.

3. The radioactive substance-removing apparatus according to claim 1 or 2 wherein the radioactive surface-adsorbing material is selected from a group consisting of stainless steel, iron, nickel, chromium, cobalt, manganese, an alloy of these metals, β-alumina and active carbon.

* * * * *